(12) United States Patent
Demmith et al.

(10) Patent No.: US 11,306,637 B1
(45) Date of Patent: Apr. 19, 2022

(54) HEAT TRANSFER DEVICE, SYSTEM AND METHOD TO BOOST FUEL ECONOMY IN DIESEL POWERED VEHICLES

(71) Applicants: Kenneth Lee Demmith, Pound, WI (US); Nathan Timothy Zeitler, Pound, WI (US)

(72) Inventors: Kenneth Lee Demmith, Pound, WI (US); Nathan Timothy Zeitler, Pound, WI (US)

( * ) Notice: Subject to any disclaimer, the term of this patent is extended or adjusted under 35 U.S.C. 154(b) by 0 days.

(21) Appl. No.: 17/091,558

(22) Filed: Nov. 6, 2020

(51) Int. Cl.
| | | |
|---|---|---|
| F01N 13/00 | (2010.01) | |
| F01N 3/20 | (2006.01) | |
| F02M 31/16 | (2006.01) | |
| F01N 3/023 | (2006.01) | |
| F01N 3/08 | (2006.01) | |

(52) U.S. Cl.
CPC ........... *F01N 3/2066* (2013.01); *F02M 31/16* (2013.01); *F01N 3/0234* (2013.01); *F01N 3/0821* (2013.01); *F01N 3/2006* (2013.01); *F01N 2240/02* (2013.01); *F01N 2610/02* (2013.01); *F01N 2610/10* (2013.01)

(58) Field of Classification Search
CPC ............ F01N 2240/02; F01N 2610/10; F01N 2610/1486; F02M 31/16; F02M 31/20
See application file for complete search history.

(56) References Cited

U.S. PATENT DOCUMENTS

| | | | | |
|---|---|---|---|---|
| 2,060,936 | A * | 11/1936 | Haag, Jr. ................. | F28D 7/026 165/156 |
| 3,070,975 | A * | 1/1963 | Cornelius ................. | F01P 9/06 62/238.1 |
| 3,253,647 | A * | 5/1966 | Deshaies ................. | F02M 31/16 165/44 |
| 4,218,999 | A * | 8/1980 | Shearer ................... | F28D 7/106 123/557 |
| 4,326,491 | A * | 4/1982 | Burchett ................. | F02M 31/16 123/557 |
| 5,806,502 | A * | 9/1998 | Thomas ................. | F02M 31/10 123/557 |
| 2004/0025498 | A1* | 2/2004 | Lambert ................. | F02M 53/00 60/286 |
| 2008/0092531 | A1* | 4/2008 | Suzuki ................... | F01N 3/2066 60/301 |
| 2014/0224449 | A1* | 8/2014 | Valfridsson ............. | F01P 11/04 165/43 |
| 2015/0135684 | A1* | 5/2015 | Lee ........................ | F01N 3/0234 60/286 |
| 2016/0222629 | A1* | 8/2016 | Tsuda .................... | B60K 13/04 |
| 2017/0226904 | A1* | 8/2017 | Mehring ............... | F01N 3/2066 |
| 2019/0211740 | A1* | 7/2019 | Larose, Jr. ............. | F01P 3/12 |

FOREIGN PATENT DOCUMENTS

| | | | | | |
|---|---|---|---|---|---|
| WO | WO-2009034833 | A1 * | 3/2009 | .......... | F01N 3/2066 |
| WO | WO-2009078757 | A1 * | 6/2009 | .......... | B60K 15/063 |

* cited by examiner

*Primary Examiner* — Jonathan R Matthias

(74) *Attorney, Agent, or Firm* — Joseph S. Heino; Erin E. Kaprelian

(57) ABSTRACT

A heat exchanging device uses a shell and tube structure whereby a portion of a diesel fuel line with or without a portion of a diesel exhaust fluid line, is placed in heat-exchanging relationship with a portion of the shell. Hot fluid flowing through the shell in a vortex-like fashion heats the diesel fuel line and the diesel exhaust fluid line to improve diesel fuel mileage and diesel exhaust efficiency.

10 Claims, 2 Drawing Sheets

HEAT TRANSFER DEVICE, SYSTEM AND METHOD TO BOOST FUEL ECONOMY IN DIESEL POWERED VEHICLES

FIELD OF THE INVENTION

The present invention relates generally to devices and systems that are used with the internal combustion engine of a motor vehicle, and particularly to vehicles powered by diesel fuel. More specifically, it relates to a shell and multi-tube heat exchanger (or "heat transfer device") that is used to transfer heat generated within an internal combustion engine to a portion of the fuel line such that the fuel passing through that portion of the line disposed within the heat transfer device is heated prior to combustion thereby realizing an increase in the mileage obtained per unit of fuel used by the motor vehicle as compared to conventional use of the internal combustion engine. Such shell and multi-tube heat exchanger can also be used to heat diesel exhaust fluid passing through another line connected to and disposed within the heat transfer device. It also relates to a method for boosting fuel economy in a motor vehicle wherein the heat exchanger is disposed within a particular position relative to the fuel line and relative to the diesel exhaust fluid line of a diesel-powered vehicle.

BACKGROUND OF THE INVENTION

Diesel engines are well known in the art. Like a gasoline engine, a diesel engine is an internal combustion engine. An internal combustion engine is simply one where fuel is burned inside the main part of the engine (i.e., via cylinders disposed within the combustion chamber) where power is produced. Diesel engines are, in this way, similar to gasoline engines but are actually simpler in construction and operation. In operation, air s allowed into the cylinder and a piston compresses it, but much more so than in a gasoline engine. In a gasoline engine, the fuel and air mixture is compressed to about a tenth of its uncompressed volume. In a diesel engine, air is compressed up to as much as 25 times. This is because compression of a gas (in this case, air) generates heat—so much heat that, in fact, the air can get up to 1,000° or more. Once the air is fully compressed by the upstroke of the piston, a mist of diesel fuel is sprayed into the cylinder. Because the air is so hot, the fuel instantly ignites and explodes without any need for a spark plug. The explosion of the diesel fuel pushes the piston back out of the cylinder. When the piston goes back into the cylinder, the exhaust gases are pushed out through an exhaust valve and the process repeats. This produces the power that drives the vehicle.

Another reality of diesel engines is that such engines have had a reputation for spewing black clouds of diesel exhaust into the air. In point of fact, the Environmental Protection Agency, in 2010, mandated the use of selective catalytic reduction ("SCR") devices in diesel engines. SCR works mostly due to diesel exhaust fluid ("DEF"). The reality of SCR and DEF is the increase in diesel fuel efficiency and reduced emissions. From a chemical perspective, diesel combustion creates some undesirable exhaust—nitrogen monoxide and nitrogen dioxide. In an SCR-equipped vehicle, this exhaust gas is routed first through a particulate filter, also known as a diesel particulate filter ("DPF"), to catch all of the particulates (soot and ash) generated from burning an impure fuel, which is the diesel fuel. From the particulate filter, the exhaust gas travels past a nozzle that sprays DEF coming from a DEF line into the stream of exhaust gas coming out of the DPF. DEF comprises deionized water and a pure form of urea. The hot exhaust gas and DEF then enter the SCR catalytic converter where the urea from the DEF and the exhaust gas react with a number of metallic compounds to convert the nitrogen monoxide and nitrogen dioxide into nitrogen and water, both harmless to the environment.

Shell and tube heat exchangers are known in the art as well. Such heat exchangers typically utilize two fluids, of different starting temperatures, that flow through the heat exchanger. One fluid flows through a centrally-disposed tube and the other fluid flows outside of the tube but inside some sort of a container that overlays the tube, or a portion of it. Heat from one fluid is thus transferred from the container to one fluid to the other through the tube walls that pass through the container. Preferably, the material used for construction of the tube walls is typically a metal that is highly heat conductive. Such metals may include copper, aluminum or brass, but the present invention is not so limited.

In the area of fuel economy—an area that is continuing to be a major factor in the movement away from fossil fuels to other fuels—the harsh reality is that diesel will continue to be the major fuel for motor vehicles in this country and elsewhere for many years to come. This will likely continue until we are able to eventually wean ourselves away from diesel as a fuel source for motor vehicles.

Because diesel fuel is ignited, as described above, at such high temperatures, it was a goal of these inventors to utilize a shell and tube configuration to add heat to the diesel fuel that flows through the fuel line and to the DEF that flows into the exhaust system. The heat added to the fuel line makes the diesel engine run more efficiently. The heat added to the DEF helps increase the scrubbing of fuel exhaust.

Another goal, however, is to utilize such a shell and tube device in such a way that has never before been used with diesel vehicles of current manufacture. In this way, diesel vehicles can be retrofitted with a fuel economy boosting device and with a more efficient DEF exhaust system. New vehicles may be considered for fabrication with such a device as original equipment as well.

SUMMARY OF THE INVENTION

The present invention is considered to cover the device itself as well as the method in which it is used.

The device of the present invention provides for a heat exchanging device that uses a shell and tube structure whereby a portion of the diesel fuel line with or without a portion of the diesel exhaust fluid line, is placed in heat-exchanging relationship with a portion of the shell. When configured and placed in this fashion, fuel savings of up to twenty percent (20%) has been realized in tests conducted on behalf of these inventors.

The foregoing and other features of the device and method of the present invention will be apparent from the detailed description that follows.

DETAILED DESCRIPTION OF THE INVENTION

Figure 1:
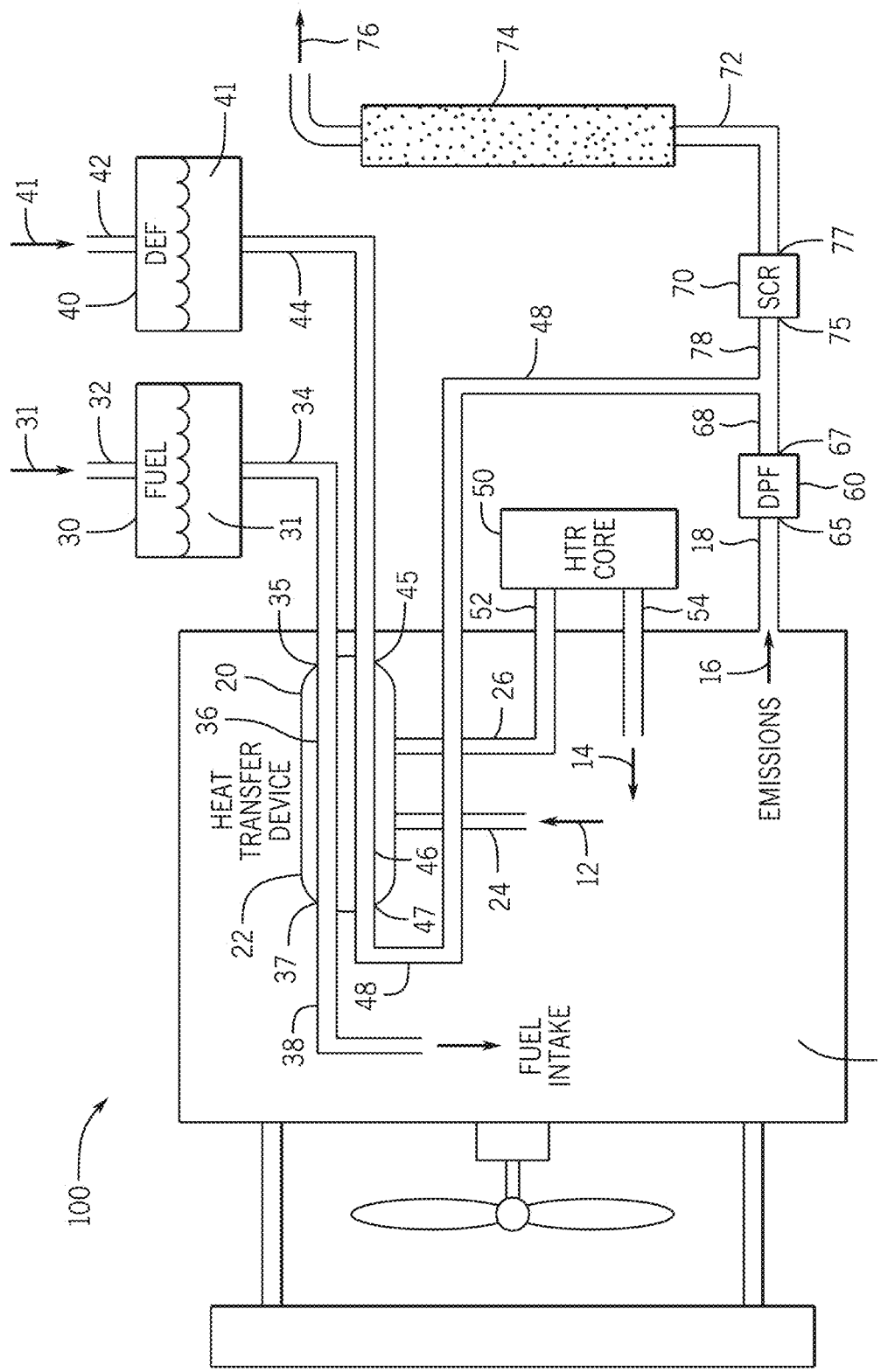
FIG. 1 is a schematic of a diesel engine and a system, less the internal elements common to all diesel engines, but including the heat transfer device, the fuel tank reservoir and the DEF reservoir, together with the DPF and the SCR catalyst, all of which show the fluid flow dynamics between those respective devices.

Referring now to the drawing in detail, wherein like numbered elements correspond to like elements throughout, FIG. 1 is a schematic view of perspective view of a preferred embodiment of a diesel engine system, generally identified 100, which is constructed in accordance with the present invention. The diesel engine system 100 generally comprises a diesel engine 10, which could include the engine 10 and other devices normally associated with the engine 10 but are not specifically shown. As shown, and for purposes of illustration only, the heat transfer device 20, is shown as being part of the engine 10 but need not be. The diesel engine system 100 of FIG. 1 also shows the fuel tank or reservoir 30 and the fluid diesel exhaust fluid tank 40. Also shown is the heater core 50. As part of an exhaust subassembly of the system 100 is the diesel particulate filter ("DPF") 60, the selective catalytic reduction ("SCR") catalyst 70 and a standpipe muffler 80.

As shown, the heat transfer device 20 comprises a shell 22 having a continuous outer and closed surface or wall. See, also, FIG. 2. In the preferred embodiment, the shell 22 is a unitary structure that is substantially cylindrical in shape and has opposing dome-like ends. This configuration is preferred because it creates a vortex-like flow of fluid 12 through the shell 22. The shell 22 further defines a void 21 therein together with a plurality of inflow ports and outflow ports, between which ports extend a plurality of flow-through lines. More specifically, the shell 22 comprises an inflow port 35 and an outflow port 37 for that portion of the fuel line 36 that extends therebetween. Similarly, there is an inflow port 45 and an outflow port 47 for the DEF line 46 that extends therebetween. Lastly, there is an inflow port 23 and an outflow port 25 of the heat transfer device 20. The shell 22 and the portions of the lines that pass through it are also intended to be heat dissipating structures such that heat from fluid 12 in the void 21 of the device 20 is imparted to the line segments 36, 46 passing through the shell 22. The foregoing lines may be welded in place for providing structural integrity to the device 20. Some of the welds 27 can be shown in FIG. 2.

Figure 2:
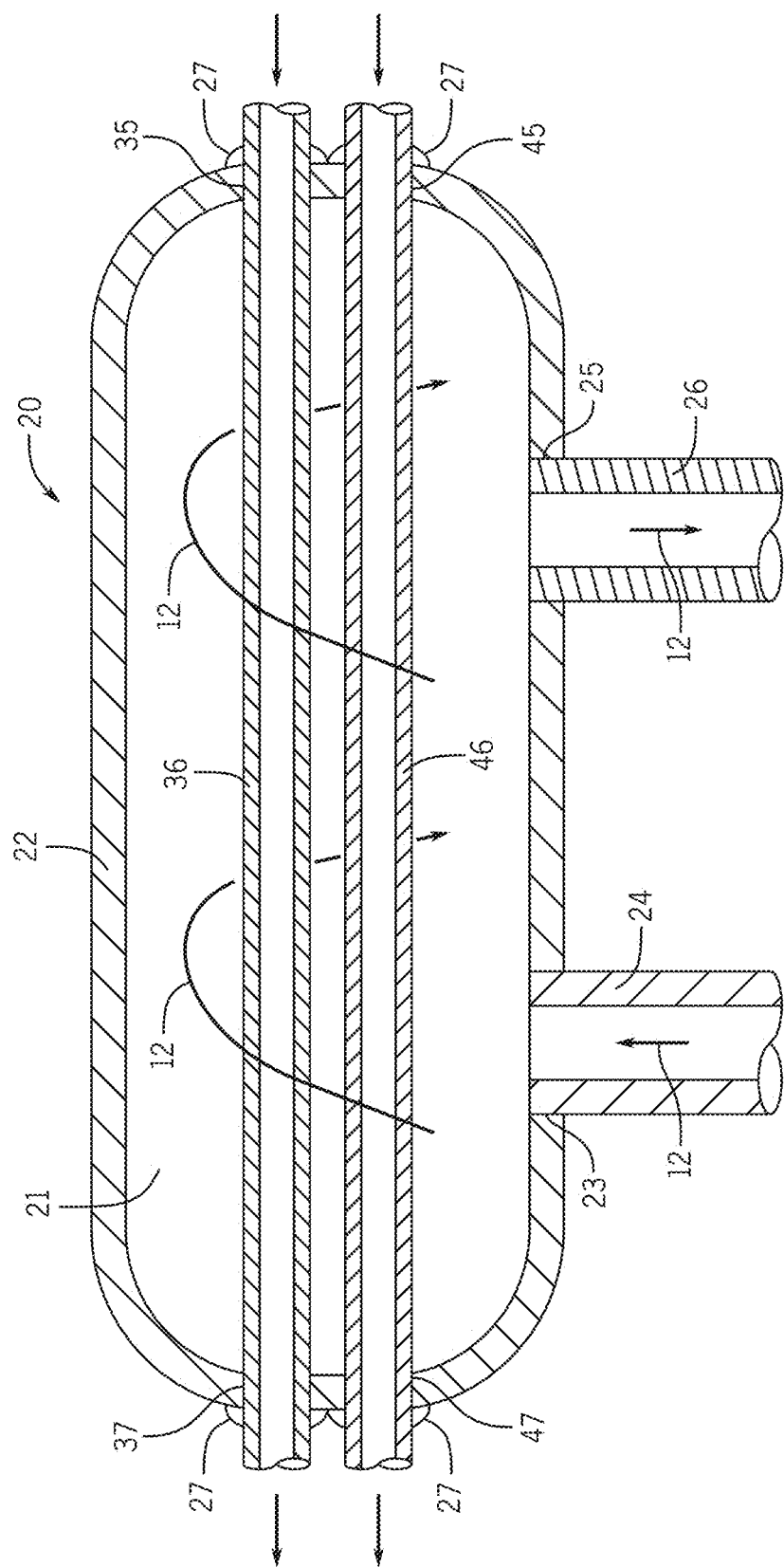
FIG. 2 is cross-sectioned view of the heat transfer device shown in FIG. 1.

As alluded to above, and also shown in FIG. 2, are the fluid flow dynamics of an extremely hot fluid 12 flowing into the shell inlet 23 via a first shell tube 24; the fluid 12 then flowing into the shell void 21 and then through and around the line portions or segments 36, 46 internal to the shell 20 in a whirling vortex-like fashion to maximize heat transfer therebetween; and the fluid 12 then flowing out of the shell 20 via a second shell tube 26. To provide maximum heat transfer, the void 21 of the shell 20 should be completely air-less and completely full of fluid 12. The shell 22 may also be insulated to further maximize heat transfer to the line portions or segments 36, 46.

As shown, the diesel fuel reservoir 30 comprises a fuel intake or fill port 32 and a fuel outflow line 34. The diesel fuel 31 is contained within the reservoir 30 and all such lines associated with it. Diesel fuel flowing through the outflow line 34 is directed to flow toward the heat transfer device 20. Upon reaching the inflow port 35 of the heat transfer device 20, diesel fuel continues to flow through the inflow port 35 and into a portion or segment of the line 36 that is disposed within the heat transfer device 20. Lastly, fuel exits the outflow port 37 and flows into the last portion of the fuel line 38 which is a line leading to the fuel injection ports of the engine's cylinders (not shown). It is to be understood that the ports 35, 37, 45, 47 of the shell 22 are configured to be rigid elements that protrude from the shell 22 sufficiently that a high-pressure fitting (not shown) can be used to attach the lines 34, 38, 44, 48 to them, respectively.

As is also shown, the DEF reservoir 40 comprises a DEF fluid intake port 42 and a DEF fluid outflow line 44. The DEF fluid 41 is disposed therein. DEF fluid 41 flowing through the outflow line 44 is directed to flow toward the heat transfer device 20. Upon reaching inflow port 45 of the heat transfer device 20, DEF fluid 41 continues to flow through the segment or portion of the line 46 that is disposed within the heat transfer device 20. Similarly, DEF fluid 41 flows out of the heat transfer device 20 via the outflow port 47 and into the line 48, which will be discussed in further detail later in this detailed description.

As shown, the heater core 50 comprises an inlet port 52 and an outlet port 54. The fluid (not shown) that flows out of the heat transfer device 20 flows into the inlet port 52 and out of the outlet port 54.

As shown, the diesel engine 10 comprises an exhaust port 16 leading to the exhaust portion of the system 100. That exhaust port 16 leads to a first portion 18 of an exhaust pipe. At the distal end of that pipe 18 is an inflow port 65 of the diesel particulate filter 60. The exhaust that is upstream of the DPF 60 comprises undesirable exhaust, including comprises nitrogen monoxide and nitrogen dioxide. That exhaust is scrubbed by the DEF 60 and then flows from the outflow port 67 of the DPF 60. Downstream of the DPF 60 is a second portion 68 of the exhaust pipe. Downstream relative to the DPF 60 is an inflow port 75 of the SCR 70. The SCR 70 comprises an upstream portion 78 of the exhaust pipe. At the intersection of the exhaust pipe portions 68, 78 (which are essentially continuous), the outlet of the DEF line 48 "taps" into the exhaust pipe to inject DEF 41 into the exhaust. The DEF 41 comprises deionized water and a pure form of urea that is mixed in with the exhaust leading to an inflow port 75 of the SCR 70. The exhaust gas and the heated DEF 41 from the heat transfer device 20 then enter the SCR catalytic converter 70 where the urea from the DEF and the exhaust gas react with a number of metallic compounds to convert the nitrogen monoxide and nitrogen dioxide into nitrogen and water.

In application, the diesel fuel reservoir 30 is filled with diesel fuel 31 via its fuel intake port 32. The fuel 31 then flows out of the reservoir 30 via the fuel outflow line 34. The diesel fuel 31 flowing through the fuel outflow line 34 is directed to flow toward the heat transfer device 20. Upon reaching the heat transfer device 20, diesel fuel 31 continues to flow through a portion of the line 36 that is disposed within the heat transfer device 20. During its passage through that portion of the line 36, a significant amount of heat is transferred or imparted to the diesel fuel 31. Continuing its flow, the heated diesel fuel 31 flows into the last portion of the fuel line 38 which is a line leading to the fuel injection ports of the cylinders (not shown). Further to the system and method disclosed herein, the DEF reservoir 40 comprises a DEF fluid intake port 42 and a DEF fluid outflow line 44. As with the diesel fuel, the DEF fluid 41 similarly flows from the reservoir 40 via the outflow line 44 and is also directed to flow toward the heat transfer device 20. Upon reaching the heat transfer device 20, DEF fluid 41 continues to flow through a portion of the line 46 that is disposed within the heat transfer device 20. During its passage through that portion of the line 46, a significant amount of heat is transferred or imparted to the DEF fluid

41. Continuing its flow, the heated DEF fluid 41 flows out of the heat transfer device 20 via line 48 and towards the exhaust portion of the system which includes the DPF 60 and the SCR 70.

Emissions from the diesel engine 10 flow out of it via the exhaust port 16 leading to the exhaust portion of the system 100 and the exhaust is converted to nitrogen and water, as described above. The exhaust passes through the DPF 60, is treated by the heated DEF 41 passing through the line 48, then through the SCR 70 and to the remaining portions of the exhaust subassembly, namely the exhaust pipe 72, muffler 74 and out the tail pipe 76 of that subassembly and into the environment.

The details of the invention having been disclosed in accordance with the foregoing, we claim:

1. A system, comprising:
    a diesel engine;
    a diesel exhaust fluid (DEF) reservoir;
    a diesel fuel reservoir; and
    a heat transfer device, the heat transfer device further comprising:
        a shell, wherein the shell further comprises:
            an inflow port;
            a void; and
            an outflow port such that hot fluid can pass into the shell via the inflow port, through the shell in a vortex-type flow, and out of the shell via the outflow port;
        a first diesel fuel line portion disposed between the diesel fuel reservoir and the shell such that the diesel fuel line is in a heat-exchanging relationship with the shell;
        a second diesel fuel line portion disposed within the shell, wherein the second diesel fuel line portion is constructed from a heat conductive material such that hot fluid flowing within the shelf transfers heat to the second diesel line portion;
        a third diesel fuel line portion disposed between the shell and fuel injection ports of the diesel engine;
        a first DEF line portion disposed between the DEF reservoir and the shell;
        a second DEF line portion disposed within the shell, wherein the second DEF line portion is constructed of a heat conductive material such that hot fluid flowing within the shell transfers heat to the second DEF line portion; and
        a third DEF line portion disposed between the shell and an exhaust subassembly of the diesel engine.

2. The system of claim 1, wherein the exhaust subassembly comprises:
    a diesel particulate filter (DPF);
    a selective catalytic reduction (SCR) catalyst;
    a downstream portion of an exhaust pipe extending from the DPF, wherein a portion of the third DEF line intersects the downstream portion of the exhaust pipe; and
    an upstream portion of an exhaust pipe extending from the SCR, wherein a portion of the third DEF line intersects the upstream portion of the exhaust pipe.

3. The system of claim 1, wherein the shell further comprises a cylindrical portion having dome-like ends.

4. The system of claim 3, wherein the shell further comprises a unitary structure.

5. The system of claim 4, wherein the shell is comprised of a heat-conductive metal material.

6. A system, comprising:
    a diesel engine;
    a diesel fuel reservoir;
    a diesel exhaust fluid (DEF) reservoir, and
    a heat transfer system disposed in a heat-exchanging relationship with the diesel fuel reservoir, wherein the heat transfer system further comprises:
    a shell, wherein the shell further comprises:
        an inflow port;
        a continuous and closed wall;
        a void created by the continuous and closed wall; and
        an outflow port such that hot fluid can pass into, through and out of the shell;
    a diesel fuel line extending between the diesel fuel reservoir and fuel injection ports of the diesel engine, wherein the diesel fuel line further comprises a portion that passes through the shell and heats the diesel fuel therein; and
    a DEF line extending between the DEF reservoir and an exhaust subassembly, wherein:
        the DEF line comprising a portion that passes through the shell and heats the DEF therein; and
        the exhaust subassembly further comprises:
            a diesel particulate filter (DPF);
            a selective catalytic reduction (SCR) catalyst; and
            an exhaust pipe portion extending between the DPF and the SCR;
        wherein the shape of the shell creates a vortex flow-like passage of fluid through the shell and around the portion of the diesel fuel line that passes through the shell and around the portion of the DEF line that passes through the shell.

7. The system of claim 6, wherein the shell further comprises a cylindrical portion having dome-like ends.

8. The system of claim 6, wherein the shell is comprised of a heat-conductive metal material.

9. The system of claim 6, wherein the shell further comprises a unitary structure consisting of a fluid inflow port, a fluid outflow port, the portion of the diesel fuel line that passes through the shell and the portion of the diesel exhaust fluid line that passes through the shell.

10. The system of claim 9 wherein:
    the portion of the DEF line that passes through the shell and adds heat to the DEF further comprises:
        an outflow port; and
        an additional portion of the DEF line that extends to a point of intersection with a portion of an exhaust pipe portion extending between the DPF and the SCR, wherein:
            the outlet of the additional portion of the DEF line and the heated DEF taps into the exhaust pipe portion such that exhaust gases are injected into the heated DEF passing from the DPF and upstream of the SCR;
            the exhaust gases comprise nitrogen monoxide and nitrogen dioxide; and
            the exhaust gases are converted to nitrogen and water as they pass through the SCR and exit the system.

\* \* \* \* \*